Patented July 7, 1953

2,644,742

UNITED STATES PATENT OFFICE 2,644,742

PROCESS AND CHARGE FOR MANUFACTURING SODIUM SILICATE GLASSES

Robert C. Danison, Painesville, Ohio, assignor to Diamond Alkali Company, Cleveland, Ohio, a corporation of Delaware No Drawing. Application February 24, 1950, Serial No. 146,161

11 Claims. (Cl. 23—110)

This invention relates to improvements in the manufacture of alkali metal silicate glasses and more particularly relates to improvements in that method of manufacturing sodium silicate glasses, which includes fusing a mixture of silica and a sodium base, such as sodium hydroxide, sodium carbonate, or sodium bicarbonate.

In the manufacture of alkali metal silicate glasses, a mixture of a silica-containing material, such as sand, with an alkali metal base compound, such as an alkali metal hydroxide, for example, sodium hydroxide, or alkali metal carbonate, such as sodium carbonate, or bicarbonate, such as sodium bicarbonate, is heated to fusion temperatures of the order of 2500° F. in a furnace in which oil or gas-fired burners are directed toward the fusing charge. The hot gaseous products of combustion leave the fusion chamber of the furnace and are passed through a fire brick "checker work" heat absorber and then to a waste heat steam generator. The "checker work" consists of a maze of loosely placed, alternately spaced rows of fire brick extending along an appreciable portion of a flue venting the fusion chamber of the furnace and in close proximity thereto. Generally, a furnace is provided with two flues with "checker work" zones in each flue, whereby the secondary air fed to the burners is pre-heated by alternatively passing the burner gases and then air over the "checker work."

When the charge of silica and alkali, both of which are in granular form to increase the reaction rate, is fed to the furnace, appreciable amounts of the finely divided alkali material are carried out of the fusion chamber of the furnace, particularly under the influence of the currents set up in the furnace by the burners, and lodge in the "checker work" of the flue. In some instances, especially where sodium carbonate is used in the furnace charge, the alkali material may also carry over into the waste heat steam generator and foul the tubes and flues thereof. The alkali which lodges in the "checker work" chemically attacks the fire brick at the elevated temperature thereof, causing considerable erosion and a consequent overall loss of efficiency of the furnace.

The present invention is directed to improvements in the above-described method of manufacturing alkali metal silicate glasses having a $Na_2O$ to $SiO_2$ ratio on a mol basis of the general order of 1:1 to 1:3.7, 1:1.58 to 1:3.7 being especially suitable. The invention contemplates mixing a mineral oil with the silica and alkali material prior to subjecting the mix to the fusion temperatures of the furnace, whereby dusting of the alkali material and loss thereof from the fusion chamber of the furnace is appreciably diminished and the useful life of a furnace unit is substantially increased, and whereby a more rapid and more complete fusion of the furnace charge is effected and a superior end product is obtained.

The mineral oil to be used in the improved method of the present invention is suitably a light mineral oil having a viscosity of between 30 and 100 Saybolt Universal seconds (S. U. S.), at 100° F., preferably a mineral oil having a viscosity within the range of 40–60 S. U. S. Fuel oils possessing lubricating properties, for example, No. 3 fuel oil, or light paraffin oils having a viscosity of the order of 40–60 S. U. S., or oils intermediate that of the kerosene fraction and a S. A. E. No. 10 lubricating oil have also been found suitable in the method of the present invention. The oils should also possess such cohesiveness and ability to wet that when added to a mixture of sand and an alkali metal base, such as sodium carbonate, in an amount of the order of one-half to two percent of the combined weight of sand and alkali material, they will give a mixture in which the particles of sand and alkali material are loosely bound together so that the free-flow characteristics of the component parts of the mix are substantially undisturbed. It has been found, in general, that the free-flow characteristics of the sand and soda ash mix are not materially decreased by combining therewith a mineral oil having a viscosity substantially within the range of 30–100 S. U. S., preferably, however, within the range of about 40 to about 60 S. U. S. The less viscous lubricating and fuel oils within this range readily mix with the sand and alkali material to give a mix which has substantially the same angle of repose as the mixture of the same amount of sand and alkali material without the oil, and it has been found that the oil may be mixed rapidly with the inorganic materials, for example, in a matter of relatively few minutes. Heavier oils than those noted within the above range, while advantageous, require a slightly longer mixing time in order to obtain a substantially uniform coating of the particles of the inorganic materials than that afforded by the usual production schedule. Moreover, it has also been found that the lighter oils result in spreading of the mix in the furnace to an optimum degree.

The factor of the angle of repose, or free-flow characteristics of the mass of silica and alkaline material, is not without its importance since a charge of the mixture is introduced into the furnace through a relatively narrow conduit and the force of the fall of the mix is relied upon to produce a uniform spread of the material over the floor of the furnace. Where the free-flow characteristics of the mix are substantially disturbed, i. e., where the angle of repose is substantially increased, it has been found that the time required to produce a uniform melt is also substantially increased because of the poorer heat transfer through a higher pile of material. In addition to the preferred viscosity characteristics of the oils to be employed in the improved method of the present invention, it is also preferable to employ an oil consisting substantially only of hydrocarbons, since oils containing substantial amounts of inorganic materials may adversely affect the color and quality of the silicate glass ultimately to be obtained. Where color is not a significant factor in the product, other oils may be used.

In order that those skilled in the art may better understand the improved method of the present invention and in what manner the same may be carried into effect, the following specific examples are offered:

*Example 1*

A commercial silica sand having the following screen analysis is used to prepare mixtures of sand and commercial "light" soda ash in the test (U. S. Series screen mesh) described below:

| | Per cent |
|---|---|
| Retained on 20 mesh | 0.0 |
| Retained on 40 mesh | 29.6 |
| Retained on 60 mesh | 50.5 |
| Retained on 80 mesh | 15.0 |
| Retained on 100 mesh | 3.4 |

Mixes of this sand and "light" commercial soda ash (58% $Na_2O$) are prepared in the following proportion:

| | Gms. |
|---|---|
| Sand | 1312 |
| Soda ash | 688 |

These mixes ($Na_2O : SiO_2 = 1 : 3.28$) are then combined with the following identified lubricating or fuel oils in the proportions indicated below:

(A) With 1% No. 3 furnace oil (viscosity max. 45 S. U. S.).
(B) With 2% No. 3 furnace oil (viscosity max. 45 S. U. S.).
(C) With 1% light paraffin oil (viscosity 50–60 S. U. S.).
(D) With 2% light paraffin oil (viscosity 50–60 S. U. S.).
(E) Without added oil.

These mixes are prepared in a Z blade mixer by agitating the mix for a period of ten minutes. Thereafter, 250 gms. of the mixes listed above are poured through a funnel having a one-inch opening at the apex of the cone and fall freely through a distance of 12 inches and at right angles to a stream of air moving at the rate of 645 feet per minute. The weight losses of the mixes are given in the table below:

| Mix Number | Loss, gm. |
|---|---|
| (A) | 0.23 |
| (B) | 0.37 |
| (C) | 0.25 |
| (D) | 0.35 |
| (E) | 0.43 |

Each value in the above table for the loss of material indicated is the average of three tests on each type mix.

*Example 2*

688 parts of "light" commercial soda ash (58% $Na_2O$) are first uniformly wetted with sufficient No. 3 fuel oil (2.9%) to make a mix containing 1% of the oil when combined with 1312 gms. of the sand used in the mixes described in Example 1 above. This mixture of sand, soda ash, and oil is agitated in a Z blade type mixer for a period of ten minutes and then is dropped through the apparatus described in Example 1 with the following results:

Loss—0.29 gm. (as compared with 0.23 gm. for a mixture of sand and soda ash containing 1% No. 3 fuel oil when the oil is combined with the mixture of sand and soda ash).

*Example 3*

A commercial sodium silicate producing furnace is periodically charged with 10,000 pound batches of mixtures of commercial silica sand and "dense" soda ash (58% $Na_2O$), varying in the ratios of alkali (calculated as $Na_2O$) to silica within the range of 1:2.5–3.3, over a period in excess of 20 weeks. Oil is added to the batches in various amounts within the range of 2.5–7 gallons of oil per 10,000 pound batch. The oils used include No. 2 fuel oil, No. 2 fuel oil bodied with one-half its volume of a S. A. E. 90 lubricating oil, and a commercial light lubricating oil having a viscosity intermediate that of kerosene and a S. A. E. 10 lubricating oil. The oils are applied to the mixes by means of an oil burner spray nozzle projecting a fan-shaped spray of the oil upon the juncture of streams of silica and soda ash in a bucket elevator boot. The mixes are conveyed from the boot to a screw conveyor which provides further mixing of the oil and inorganic materials and empties into charge hoppers above the furnace, from which hoppers the charges are fed to the furnace. The charging cycle through the furnace is arranged on a 2-hour basis. The following observations are made:

I. "Sand caps" remaining in the silicate furnace from previous runs are found to disappear within a matter of 2–3 charging cycles. (Sand caps are masses of unfused, unreacted silica resulting from the stratification of the sand-soda ash mixture during the charging operation of the mixture to the furnace. The disappearance of the sand caps during the subsequent charging of the sand-soda ash mixtures containing oil is indicative of the maintenance of a more uniform distribution of the sand and soda ash within the mix.)

II. The product obtained subsequent to the third charging cycle is found to be of lighter color than that obtained from mixtures of sand and soda ash alone charged to the furnace, and to be more readily soluble in water and contains less insoluble residues than such mixes.

III. The time required to melt the mix of sand and soda ash containing the oil is on the average about 100 minutes, or 20 minutes less than the usual 2-hour period for batches in which oil is not used. It is necessary therefore to diminish the amount of gas fed to the burners heating the furnace in order to maintain proper integration of the furnace production schedule with subsequent process steps.

IV. The "checker work" of the furnace flue after 26 weeks of operation shows considerable less erosion due to reaction of the fire brick therein with the alkali than is normally found where the furnace charge contained no oil.

V. The waste heat boiler tubes also show considerable less fouling due to carry-over of the soda ash during this period.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the manufacture of alkali metal silicate glasses, which includes fusing a mixture of silica and a compound of the group consisting of alkali metal hydroxides, carbonates, and bicarbonates, the improvement which includes mixing together silica, an alkali metal compound of said group, and a mineral oil, prior to subjecting the mix to fusion temperatures.

2. In the manufacture of alkali metal silicate glasses, which includes fusing a mixture of silica and a compound of the group consisting of alkali metal hydroxides, carbonates, and bicarbonates, the improvement which includes mixing together silica, an alkali metal compound of said group, and a mineral oil in an amount sufficient to loosely bind the particles of the inorganic materials and insufficient to decrease substantially the original free-flow characteristics thereof, prior to subjecting the mix to fusion temperatures.

3. In the manufacture of alkali metal silicate glasses, which includes fusing a mixture of silica and a compound of the group consisting of alkali metal hydroxides, carbonates, and bicarbonates, the improvement which includes mixing together silica, an alkali metal compound of said group, and a lubricating oil having a Saybolt Universal viscosity within the range of 30–100 seconds prior to subjecting the mix to fusion temperatures.

4. In the manufacture of sodium silicate glasses, which includes fusing a mixture of silica and a compound of the group consisting of sodium hydroxide, sodium carbonate, and sodium bicarbonate, the improvement which includes mixing together silica, a sodium compound of said group, and a lubricating oil, prior to subjecting the mix to fusion temperatures.

5. In the manufacture of sodium silicate glasses, which includes fusing a mixture of silica and a compound of the group consisting of sodium hydroxide, sodium carbonate, and sodium bicarbonate, the improvement which includes mixing together silica, a sodium compound of said group, and a lubricating oil in an amount sufficient to loosely bind the particles of the inorganic materials and insufficient to decrease substantially the original free-flow characteristics thereof, prior to subjecting the mix to fusion temperatures.

6. In the manufacture of sodium silicate glasses, which includes fusing a mixture of silica and a compound of the group consisting of sodium hydroxide, sodium carbonate, and sodium bicarbonate, the improvement which includes mixing together silica, a sodium compound of said group, and a mineral oil having a Saybolt Universal viscosity within the range 30–100 seconds, prior to subjecting the mix to fusion temperatures.

7. In the manufacture of sodium silicate glasses, which includes fusing a mixture of silica and a compound of the group consisting of sodium hydroxide, sodium carbonate, and sodium bicarbonate, the improvement which includes mixing together silica, a compound of said group, and a mineral oil having a Saybolt Universal viscosity within the range of 30–100 seconds and in an amount within the range of 0.5–2.5% of the total weight of the mixture, prior to subjecting the mix to fusion temperatures.

8. In the manufacture of sodium silicate glasses, which includes fusing a mixture of silica and a compound of the group consisting of sodium hydroxide, sodium carbonate, and sodium bicarbonate, the improvement which includes mixing together silica, a compound of said group, and a mineral oil consisting substantially only of hydrocarbons and in an amount sufficient to loosely bind the particles of the inorganic materials and insufficient to decrease substantially the original free-flow characteristics thereof.

9. In the manufacture of sodium silicate glasses, which includes fusing a mixture of silica and a compound of the group consisting of sodium hydroxide, sodium carbonate, and sodium bicarbonate, the improvement which includes mixing together silica, a compound of said group, and from 0.5–2.5% of the total weight of the mixture of a mineral oil consisting substantially only of hydrocarbons and having a Saybolt Universal viscosity of 30–100 seconds, prior to subjecting the mixture to fusion temperatures.

10. A charge for a sodium silicate furnace adapted upon fusion to yield a sodium silicate glass having a mol ratio of $Na_2O$ to $SiO_2$ of 1:1 to 1:3.7 comprising silica, a substance chosen from the group consisting of soda ash, caustic soda, and sodium bicarbonate, and a small amount of a light mineral oil.

11. A charge for a sodium silicate furnace adapted upon fusion to yield a sodium silicate glass having a mol ratio of $Na_2O$ to $SiO_2$ of 1:3.7 to 1:1.58 comprising silica, a substance chosen from the group consisting of soda ash, caustic soda, and sodium bicarbonate, and between 0.5 and 1.5% of a light mineral oil.

ROBERT C. DANISON.

References Cited in the file of this patent

UNITED STATES PATENTS

| Number | Name | Date |
|---|---|---|
| 130,538 | Rosenthal | Aug. 13, 1872 |
| 667,222 | Ivery | Feb. 5, 1901 |
| 726,091 | McKerrow | Apr. 21, 1903 |
| 1,861,711 | Moreton | June 7, 1932 |
| 2,284,248 | Baker et al. | May 26, 1942 |
| 2,345,776 | Soderberg | Apr. 4, 1944 |
| 2,390,406 | Wegst et al. | Dec. 4, 1945 |

OTHER REFERENCES

Merrill: "Journal of Chemical Education," v. 24, No. 6, pp. 262–269, June 1947. (Copy in Scientific Library.)